United States Patent [19]

Choi

[11] Patent Number: 5,774,741
[45] Date of Patent: Jun. 30, 1998

[54] PORTABLE COMPUTER HAVING A PORT CONNECTOR FOR COMMUNICATING WITH A VARIETY OF OPTIONAL EXTENSION MODULES

[75] Inventor: Jae-Chun Choi, Kyungki-do, Rep. of Korea

[73] Assignee: SamSung Electronics Co., Ltd., Kyungki-do, Rep. of Korea

[21] Appl. No.: 777,135

[22] Filed: Dec. 30, 1996

[30] Foreign Application Priority Data

Dec. 30, 1995 [KR] Rep. of Korea ............... 95-68218

[51] Int. Cl.$^6$ ............................................. G06F 13/00
[52] U.S. Cl. ..................... 395/822; 395/882; 395/281; 395/500
[58] Field of Search ........................ 395/822, 882, 395/281, 500

[56] References Cited

U.S. PATENT DOCUMENTS

| | | |
|---|---|---|
| 3,828,325 | 8/1974 | Stafford et al. ............... 340/172.5 |
| 4,371,952 | 2/1983 | Schuck . |
| 4,933,845 | 6/1990 | Hayes . |
| 5,187,795 | 2/1993 | Balmforth et al. . |
| 5,361,376 | 11/1994 | Cummins et al. . |
| 5,457,785 | 10/1995 | Kikinis et al. ..................... 395/308 |
| 5,477,544 | 12/1995 | Botelho . |
| 5,488,736 | 1/1996 | Keech et al. . |
| 5,499,341 | 3/1996 | Wilson et al. .................. 395/200.03 |
| 5,535,371 | 7/1996 | Steward et al. .................... 395/500 |
| 5,555,436 | 9/1996 | Gavish ............................. 395/821 |

*Primary Examiner*—Ayaz R. Sheikh
*Assistant Examiner*—Jeffrey K. Seto
*Attorney, Agent, or Firm*—Robert E. Bushnell, Esq.

[57] ABSTRACT

Disclosed is an apparatus capable of supporting a variety of optional extension modules for a portable computer, comprising a port connector for connecting any of the optional extension modules; and a selector for receiving a control signal from the connected module through the port connector and enabling the portable computer to communicate with the connected module. With the module supporting apparatus, a variety of optional extension modules can be connected to the computer by using the port connector. Besides basic functions, the portable computer can perform a variety of functions, such as a multi-media function, etc.

20 Claims, 5 Drawing Sheets

PORTABLE COMPUTER HAVING A PORT CONNECTOR FOR COMMUNICATING WITH A VARIETY OF OPTIONAL EXTENSION MODULES

FIELD OF THE INVENTION

The present invention relates to a portable computer having a port connector for communicating with a variety of optional extension modules. And more particularly, this invention relates to an apparatus capable of supporting a variety of optional extension modules for a portable computer, and a method for controlling the apparatus.

BACKGROUND OF THE INVENTION

Recently, a portable computer as compact as possible have been fabricated for easy transportation by a user. Besides basic functions, the portable computer includes a variety of functions, such as a sound, an image display, a multi-media, wire/wireless communication and the like. As a portable computer is more smaller, however, it cannot be equipped with all of the above functions. Thus, a maker provides optional extension modules capable of performing the above stated functions in the portable computer. This arises a new problem that a portable computer must be equipped with several port connectors therein so as to communicate with all of the optional extension modules.

SUMMARY OF THE INVENTION

It is therefore an object of the present invention to provide a portable computer having a module supporting apparatus capable of selectively communicating with a variety of optional extension modules therefor.

It is another object of the present invention to provide a method for controlling a module supporting apparatus capable of selectively communicating with a variety of optional extension modules therefore.

According to an aspect of the present invention, an apparatus of supporting a variety of optional extension modules for a portable computer, composes a port connector provided in the portable computer, for connecting any of the optional extension modules thereto; and means provided in the portable computer, for receiving a control signal from the connected module through the port connector and enabling the portable computer to communicate with the connected module in response to the control signal.

In the preferred embodiment, said means comprises a plurality of bidirectional buffers, each of which has a control terminal for receiving the control signal.

According to another aspect of the present invention, an apparatus of supporting a variety of optional extension modules for a portable computer, composes a port connector provided in the portable computer, for connecting any of the optional extension modules thereto; means responsive to voltage level of a selection signal from the connected module through the port connector, for generating a control signal; and means provided in the portable computer, for enabling the portable computer to communicate with the connected module in response to the control signal.

In the embodiment, said control signal generating means comprises a microcomputer for controlling the enabling means in response to the selection signal. The microcomputer comprises the steps of determining whether any of the extension modules is connected to the port connector in accordance with the selection signal; generating a disabling signal for disabling the computer to communicate with the optional extension modules if no extension module is connected to the port connector; determining voltage levels of the selection signal if any one of the extension modules is connected to the port connector; and generating a signal for enabling the computer to communicate with the connected module in accordance with the determined voltage level.

According to a further aspect of the present invention, a method of controlling an extension module supporting apparatus for a portable computer, comprises the steps of determining whether any of optional extension modules is connected to a port connector, which is provided in the portable computer; disabling the computer to communicate with the optional extension modules if no module is connected to the port connector; determining voltage levels of a selection signal from the connected module if any one of the extension modules is connected to the port connector; and enabling the computer to communicate with the connected module in accordance with a voltage level determined thus.

BRIEF DESCRIPTION OF THE DRAWINGS

This invention may be better understood and its objects will become apparent to those skilled in the art by reference to the accompanying drawings as follows.

DESCRIPTION OF PREFERRED EMBODIMENTS

Figure 1:
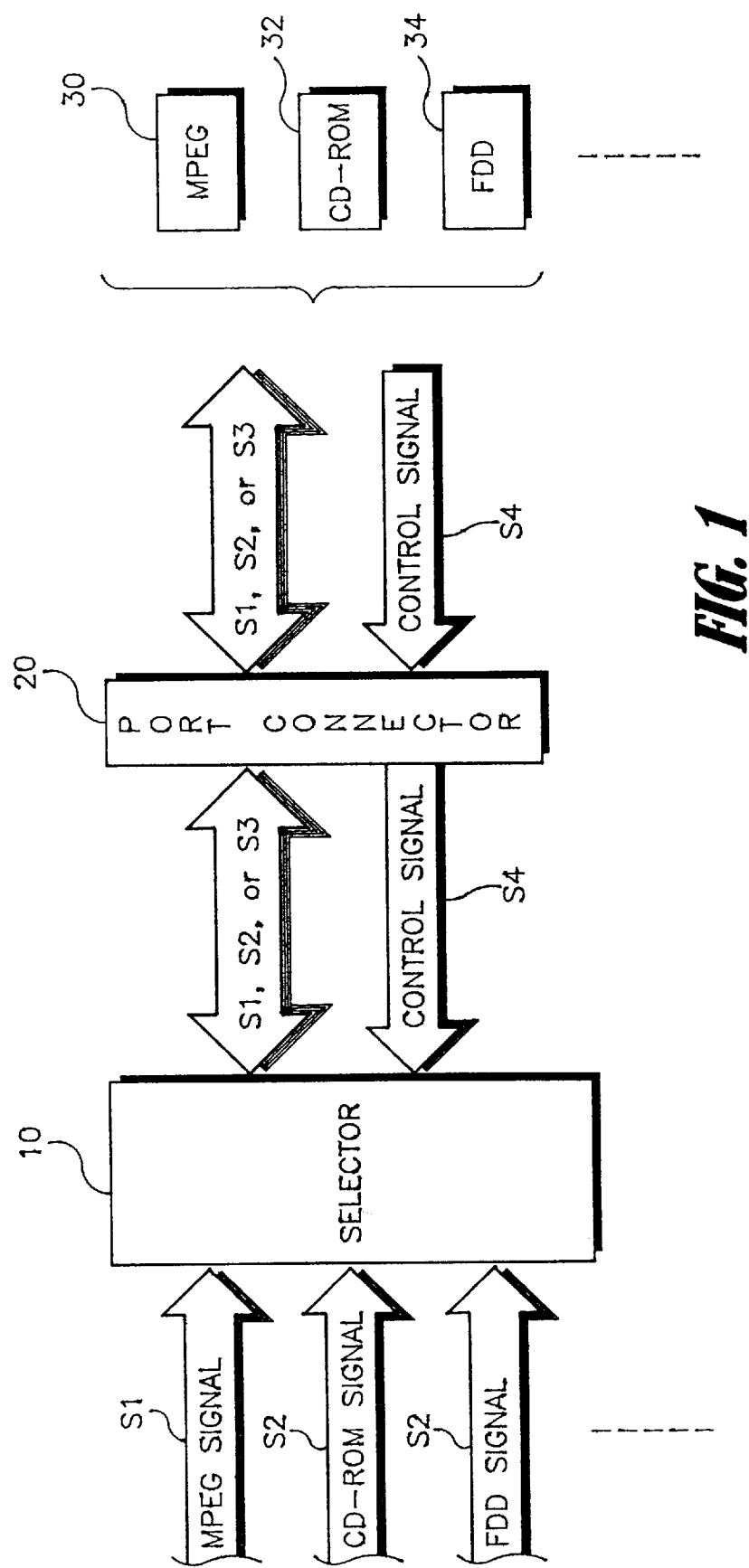
FIG. 1 is a block diagram illustrating a novel extension module supporting apparatus in a portable computer according to an embodiment of the present invention.

Referring to FIG. 1, a novel extension module supporting apparatus for a portable computer in accordance with an embodiment of the present invention is constituted with a selector 10 and a port connector 20. The port connector 20 is provided on the portable computer to connect with a variety of optional extension modules such as a video overlay board 30 for processing MPEG (Moving Picture Expert Group) data, a CD-ROM (Compact Disk-Read Only Memory) drive 32 and a FDD (Floppy Disk Drive) 34, and the like. If the optional extension modules can be connected to a portable computer through the port connector 20, the portable computer can extend its functions by the connected extension modules. Besides the connector pins of an optional extension module which has many pins, the port connector 20 has a plurality of connector pins which are composed of the connector pins corresponding to the number of optional extension modules for the portable computer.

Figure 2:
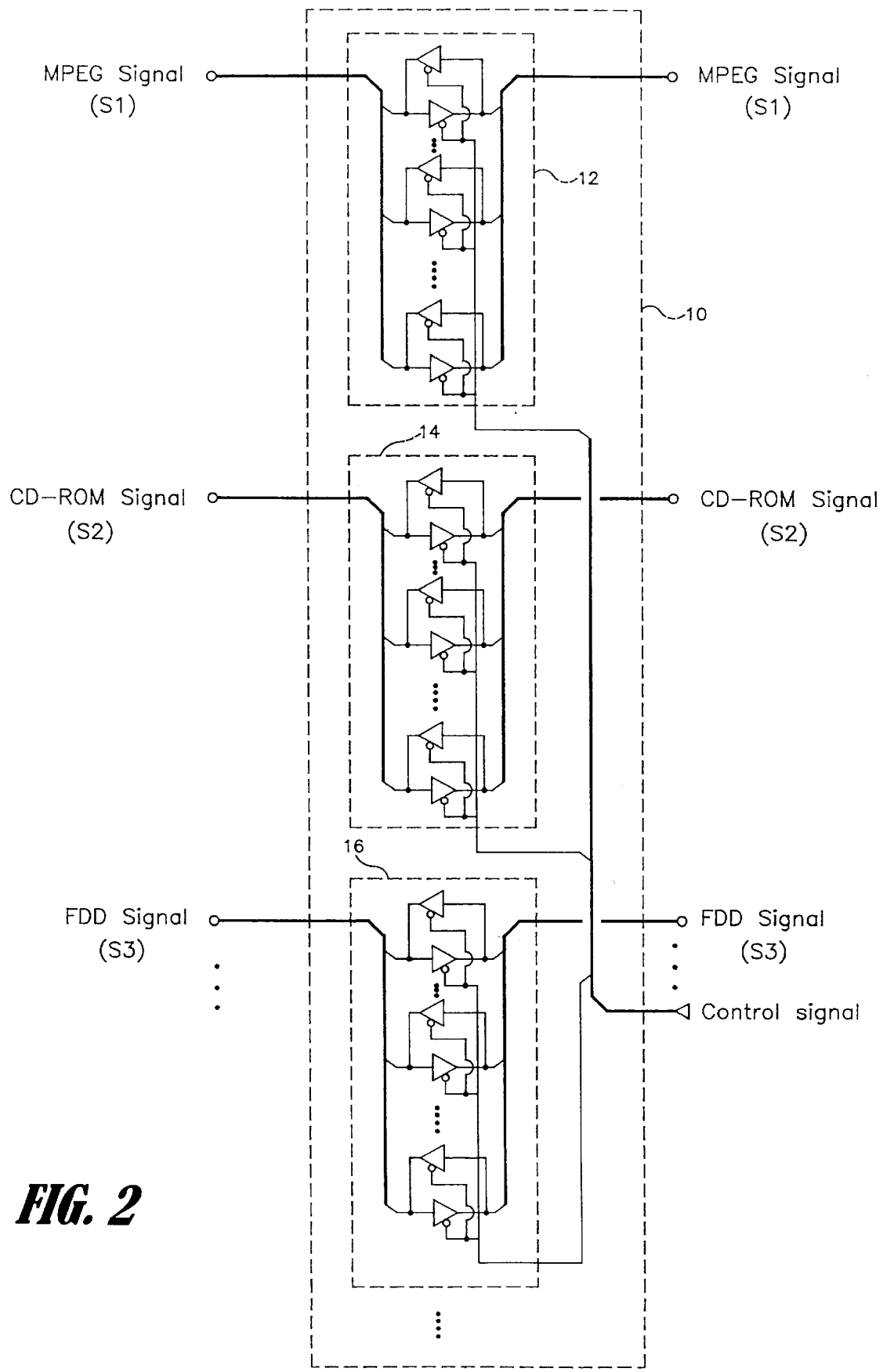
FIG. 2 is a detailed circuit diagram of a selector shown in the extension module supporting apparatus.

The selector 10 is constituted by groups of a plurality of bidirectional buffers which are controlled in response to control signals, as shown in FIG. 2. Namely, a first group 12 of bidirectional buffers are provided to enable MPEG signals S1 to be supplied from the computer to the video overlay board 30 or them to be supplied from the video overlay board to the computer, a second group 14 thereof to enable CD-ROM signals S2 from the computer to the CD-ROM drive 32 or from signals to be supplied to the CD-ROM drive to the computer, and a third group 16 thereof to enable FDD signals S3 from the computer to the FDD 34 or signals to be supplied from the FDD to the computer. When the groups of bidirectional buffers are selectively enabled, the computer can communicate with the connected module through the enabled buffers. Herein, the MPEG signals S1 include control signals and data signals, as in the CD-ROM signals S2 or the FDD signals S3.

If any of the optional extension modules 30, 32 and 34 is connected to the port connector 20, a power voltage is applied from the computer to the connected module through the port connector 20, or from an external power supply directly to the connected module. A control signal S4 is then provided from the connected module to the selector 10 via a specific pin of the port connector 20. A group of bidirectional buffers in the selector 10 are activated in response to the control signal S4, so that the computer can communicate with the connected module through the port connector 10.

For more specific example, if the video overlay board 30 is connected to the port connector 20, a control signal S4 of low level is generated from the board 30 and provided through the port connector 20 to the selector 10. Then, the bidirectional buffers 12 in the selector 10 are simultaneously selected and activated in response to the low level signal S4, so that the MPEG signals S1 are supplied from the computer to the video overlay board 30, or from the video overlay board 30 to the computer. If the CD-ROM drive 32 is connected to the port connector 20, a control signal S4 of low level is generated from the CD-ROM drive 32 and provided through the port connector 20 to the selector 10. Then, the bidirectional buffers 14 are simultaneously activated in response to the low level signal S4, so that the CD-ROM signals S2 are supplied from the computer to the CD-ROM drive 32, or from the CD-ROM drive 32 to the computer. When the FDD 34 is connected to the port connector 20, a control signal S4 of low level is generated from the FDD 34 and provided through the port connector 20 to the selector 10. Then, the bidirectional buffers 16 are simultaneously activated in response to the low level signal S4, so that the FDD signals S3 from the computer are supplied through the port connector 20 to the FDD drive 32, or from the FDD drive 32 and through the port connector 20 to the computer.

As described immediately above, because the selector 10 is controlled in response to a control signal S4 occurring when any of optional extension modules is connected to the port connector 20, a variety of optional extension modules can be connected to the port connector 20. And control signals from the video overlay board 30, the CD-ROM drive 32 and the FDD 34 are supplied through different connector pins of the port connector 20 to the selector 10.

Figure 3:
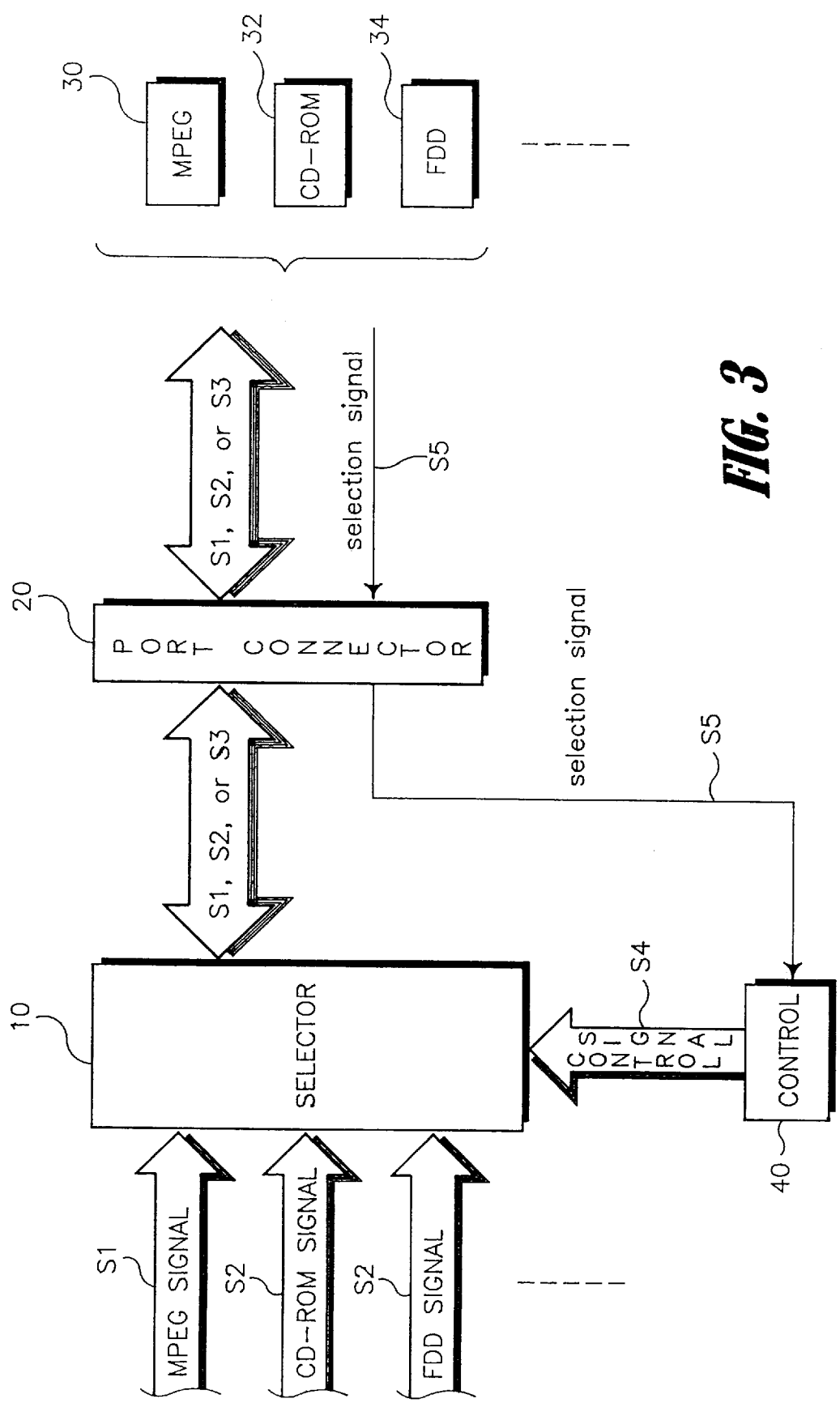
FIG. 3 is a block diagram illustrating a novel extension module supporting apparatus in a portable computer according to another embodiment of the present invention.

FIG. 3 illustrates a novel extension module supporting apparatus in a portable computer according to another embodiment of the present invention. This extension module supporting apparatus is identical in construction to the extension module supporting apparatus of the first embodiment (shown in FIG. 1), and hence identical parts are denoted by the same reference numerals to omit redundant description.

With reference to FIG. 3, a novel extension module supporting apparatus for a portable computer in accordance with another embodiment includes a selector 10, a port connector 20 and a controller 40. The controller 40 is constituted by a microcomputer for controlling the selector 10 in response to an selection signal S5 from any of optional extension modules, such as a video overlay board 30 for processing MPEG data, a CD-ROM drive 32 and a FDD 34, and the like. The controller 40 receives the selection signal S5 of a predetermined voltage through the port connector 20 and generates a control signal S4, so that it enables the computer to communicate with the module connected to the port connector 20. The selector 10 of FIG. 3 is operated in the same manner as that of the selector 10 of FIG. 1. Because the port connector 20 in this example receives a single selection signal S5 from the optional extension modules, the number of its connector pins can be reduced, as compared with the port connector 20 of the first example (shown in FIG. 1). The selection signal S5 has voltage levels corresponding to the number of the optional extension modules. Also, the selector 10 of FIG. 3 includes groups of bidirectional buffers, each control terminal of which receives a control signal S4 generated from the controller 40.

Figure 4:
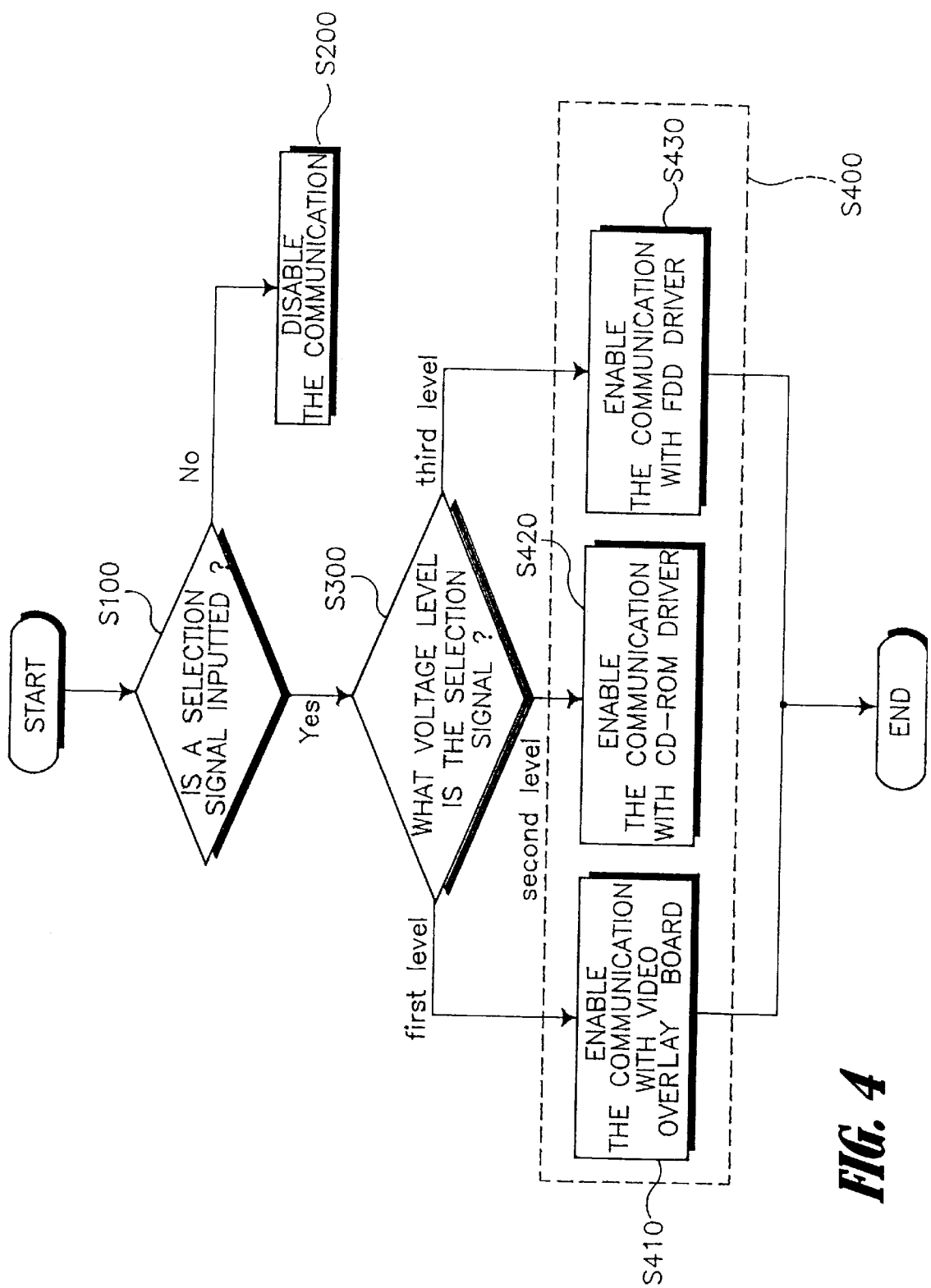
FIG. 4 is a flow chart illustrating a novel method of controlling the extension module supporting apparatus.

Hereinafter, the controlling operation of the controller 40 will be described with reference to FIG. 4.

At step S100, the controller 40 determines whether the selection signal S5 is inputted through a specific connector pin of the port connector 20. If so, the control proceeds to step S300, wherein the controller 40 determines whether any extension module is connected to the port connector 20 in accordance with the voltage level of the selection signal. If the selection signal S5 is not inputted, the control proceeds to step S200, wherein the controller 40 generates a disabling signal for disabling the computer to communicate with the connected module.

It is also assumed for clear description that the controller 40 generates a first control signal in response to a first voltage level occurring when the video overlay board 30 is connected to the port connector 20, a second control signal in response to a second voltage level occurring when the CD-ROM drive 32 is connected to the port connector 20, and a third control signal in response to a third voltage level occurring when the FDD 34 is connected to the port connector 20.

If the video overlay board 30 is connected to the port connector 20, the control proceeds to step S410, wherein the selector 10 receives the first control signal as a control signal S4 to enable the MPEG signals S1 to be provided from the computer to the video overlay board 30 through the port connector 20, or from the board 30 to the computer. This means that the computer can communicate with the video overlay board 30. If the CD-ROM drive 32 is connected to the port connector 20, the control proceeds to step S420, wherein the selector 10 receives the second control signal as a control signal S4 to enable the CD-ROM signals S2 to be provided from the computer to the CD-ROM drive 32, or from the CD-ROM drive 32 to the computer. This means that the computer can communicate with the CD-ROM drive 32. Also, if the FDD 34 is connected to the port connector 20, the control proceeds to step S430, wherein the selector 10 receives the third control signal as a control signal S4 to enable the FDD signals S3 to be provided from the computer to the FDD 34, or from the FDD 34 to the computer. This means that the computer can communicate with the FDD 34. In this embodiment, when a group of bidirectional buffers are simultaneously enabled in response to any one of the control signals from the controller 40, the other groups of bidirectional buffers are disabled.

Figure 5:
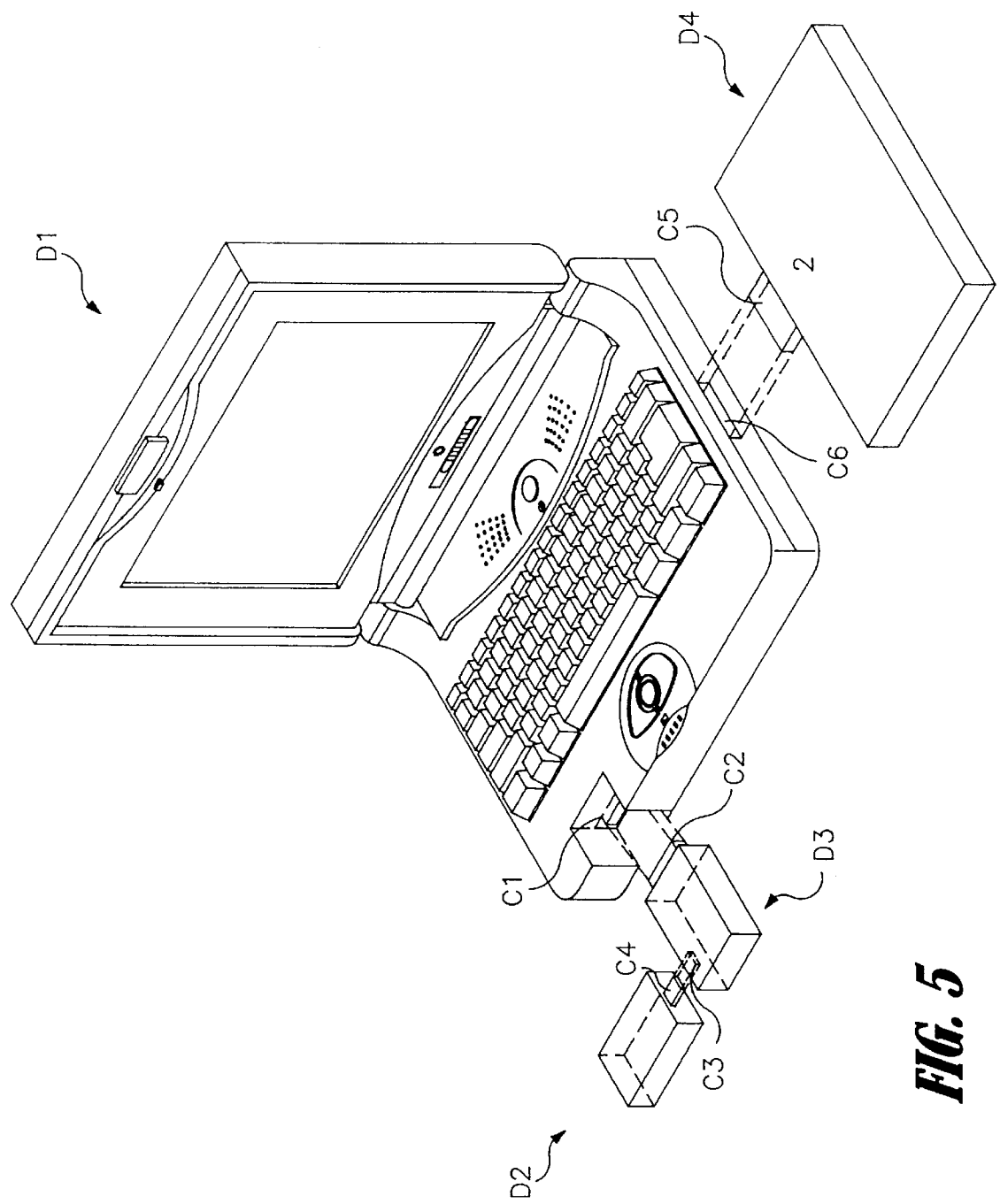
FIG. 5 is a perspective view showing a portable computer with which the extension module supporting apparatus of the present invention is implemented.

FIG. 5 shows a portable computer with which the extension module supporting apparatus of the present invention is implemented.

As shown in FIG. 5, the portable computer D1 has two port connectors C1 and C6, through which optional extension modules D2, D3 and D4 can be connected. Herein, it is assumed for brief description that the module D2 represents a CD-ROM drive, D3 represents a video overlay and MPEG board, and D4 represents another video overlay and MPEG board for a docking station. Connectors C2 to C4 of the modules D2 and the module D3 have the same specification as that of the connector C1 which is provided in the portable computer D1.

In this case, there are two methods for connecting the CD-ROM drive D2 to the portable computer. One of the above methods is to connect the CD-ROM drive D2 and the video overlay and MPEG board D3 with each other by means of the connectors C3 and C4 before the board D3 is connected to the portable computer D1 by means of the connector C1. Thus, CD-ROM signals are supplied through the connectors C4, C3, C2 and C1 to the portable computer. The other method is to connect the CD-ROM drive D2 directly to the connector C1 of the portable computer D1, and to connect the video overlay and MPEG board D4 for a docking station to the connect C6 of the portable computer D1.

As described above, an optional extension module supporting apparatus, which is embodied in a portable computer, is capable of connecting a variety of optional extension modules to the computer. Therefore, besides basic functions, the portable computer can perform a variety of functions, such as a multi-media function, etc.

What is claimed is:

1. An apparatus for supporting a variety of optional extension modules for a portable computer, comprising:
    a port connector provided in the portable computer, for connecting any of the optional extension modules to the portable computer; and
    means provided in the portable computer, for receiving a control signal from the connected module through the port connector and enabling the portable computer to communicate with the connected module in response to the control signal with the control signal being received through a different pin in the port connector for each of the optional extension modules.

2. The apparatus as defined in claim 1, wherein said receiving means comprises a plurality of bidirectional buffers, each of said directional buffers having a control terminal for receiving the control signal.

3. The apparatus of claim 1, further comprised of said receiving means comprising a plurality of groups of bidirectional buffers, with each of said groups corresponding to a different one of said optional extension modules.

4. The apparatus of claim 1, further comprised of said receiving means comprising a plurality of groups of bidirectional buffers, with each of said groups corresponding to a different one of said optional extension modules, and with said bidirectional buffers in any one of said groups being simultaneously enabled by said control signal on a corresponding said different pin to accommodate communication between the connected module and the portable computer.

5. The apparatus of claim 1, further comprised of said receiving means comprising a plurality of groups of bidirectional buffers, with each of said groups corresponding to a different one of said optional extension modules, and with said bidirectional buffers in any one of said groups being simultaneously enabled by said control signal on a corresponding said different pin to accommodate communication between the connected module and the portable computer, while said bidirectional buffers in others of said groups being disable from accommodating said communication between the connected module and the portable computer.

6. An apparatus of supporting a variety of optional extension modules for a portable computer, comprising:
    a port connector provided in the portable computer, for connecting any of the optional extension modules to the portable computer;
    means responsive to one of three or more voltage levels of a selection signal from the connected module through the port connector, for generating a control signal; and
    means provided in the portable computer, for enabling the portable computer to communicate with the connected module in response to the control signal.

7. The apparatus as defined in claim 6, wherein said enabling means comprises a plurality of bidirectional buffers, each of said directional buffers having a control terminal for receiving the control signal.

8. The apparatus as defined in claim 6, wherein said control signal generating means comprises a microcomputer for controlling the enabling means in response to the selection signal.

9. The apparatus as defined in claim 8, wherein said microcomputer performs the steps of determining whether any of the extension modules is connected to the port connector in accordance with the selection signal; generating a disabling signal for disabling the computer to communicate with the optional extension modules when no extension module is connected to the port connector; determining voltage levels of the selection signal when any one of the extension modules is connected to the port connector; and generating a signal for enabling the computer to communicate with the connected module in accordance with the determined voltage level.

10. The apparatus of claim 6, further comprised of said enabling means comprising a plurality of groups of bidirectional buffers, with each of said groups corresponding with a different one of said optional extension modules.

11. The apparatus of claim 6, further comprised of said enabling means comprising a plurality of groups of bidirectional buffers, with each of said groups corresponding with a different one of said optional extension modules, and with said bidirectional buffers in one of said groups being simultaneously enabled by said control signal to accommodate communication between the corresponding connected module and the portable computer.

12. The apparatus of claim 6, further comprised of said enabling means comprising a plurality of groups of bidirectional buffers, with each of said groups corresponding with a different one of said optional extension modules, and with said bidirectional buffers in one of said groups being simultaneously enabled by said control signal to accommodate communication between the corresponding connected module and the portable computer, while said bidirectional buffers in others of said groups being disabled from accommodating said communication between the connected module and the portable computer.

13. A method for controlling an extension module supporting apparatus for a portable computer, comprising the steps of:
    determining whether any of optional extension modules is connected to a port connection provided in the portable computer;
    disabling the computer to communicate with the optional extension modules when no module is connected to the port connector;
    determining voltage levels of a selection signal from the connected module when any one of the extension modules is connected to the port connector; and enabling the computer to communicate with the connected module in accordance with one of three or more voltage levels determined thus.

14. An apparatus for supporting a variety of optional extension modules for a portable computer, comprising:

a port connector provided in the portable computer, operationally connecting any of the optional extension modules to the portable computer while receiving on a specific terminal a recognition signal provided by each optional extension module connected to said port connector to exhibit a signal characteristic unique to the connected module;

a selector provided in the portable computer, comprising a plurality of groups of bidirectional buffers selectively accommodating communication between the portable computer and the connected module via one of said groups enabled in conformance with said recognition signal; and a controller provided in the portable computer responding to reception of said unique characteristic from said port connector by generating a control signal enabling said one of said groups in dependence upon said unique characteristic.

15. The apparatus of claim 14, further comprised of said signal characteristic exhibiting a voltage magnitude unique to each type of said variety of optional extension modules.

16. The apparatus of claim 14, with said port connector comprising a plurality of functionally distinct terminals provided in the portable computer operationally connecting any of the optional extension modules to the portable computer, while said specific terminal comprises one terminal of a specific set of said plurality of functionally distinct terminals dedicated to receiving said recognition signal.

17. An apparatus for supporting a variety of optional extension modules for a portable computer, comprising:

a port connector having a plurality of functionally distinct terminals provided in the portable computer, operationally connecting any of the optional extension modules to the portable computer while receiving via one terminal of a specific set of said plurality of functionally distinct terminals a recognition signal provided by each optional extension module connected to said port connector to exhibit a signal characteristic unique to the connected module; and a selector provided in the portable computer, comprising a plurality of groups of bidirectional buffers each, when selectively enabled in response to a corresponding said recognition signal, accommodating communication by transmission of data signals between the portable computer and the connected module via one of said groups enabled in response to said recognition signal.

18. The apparatus of claim 17, further comprised of a controller provided in the portable computer responding to reception of said unique characteristic from said port connector by generating a control signal enabling said one of said groups in dependence upon said unique characteristic.

19. The apparatus of clam 17, further comprised of:

said unique characteristic comprised of said recognition signal having a voltage varying in magnitude; and a controller provided in the portable computer responding to reception of said unique characteristic from said port connector by generating a control signal enabling said one of said groups in dependence upon said magnitude.

20. The apparatus of claim 17, further comprised of said recognition signal being received through a different terminal of said specific set of said plurality of functionally distinct terminals for each of the optional extension modules.

\* \* \* \* \*